(12) United States Patent
Loecklin

(10) Patent No.: US 6,507,013 B2
(45) Date of Patent: Jan. 14, 2003

(54) OPTICAL REFERENCE ELEMENT AND PROCEDURE FOR THE SPECTRAL CALIBRATION OF AN OPTICAL SPECTRUM ANALYZER

(75) Inventor: Eberhard Loecklin, Reutlingen (DE)

(73) Assignee: Wavetek Wandel Gotermann Eningen GmbH, Eningen (DE)

( * ) Notice: Subject to any disclaimer, the term of this patent is extended or adjusted under 35 U.S.C. 154(b) by 0 days.

(21) Appl. No.: 09/751,102

(22) Filed: Dec. 28, 2000

(65) Prior Publication Data

US 2001/0015405 A1 Aug. 23, 2001

(30) Foreign Application Priority Data

Dec. 31, 1999 (EP) .............................. 99126251

(51) Int. Cl.[7] ................................. G01J 1/10
(52) U.S. Cl. ............. 250/226; 250/227.23; 356/243.1; 356/439; 356/440
(58) Field of Search ........................... 250/226, 227.23; 356/300–334, 243.1, 437, 439, 440

(56) References Cited

U.S. PATENT DOCUMENTS

| 4,565,447 | A | * | 1/1986 | Nelson | 356/319 |
|---|---|---|---|---|---|
| 5,212,537 | A | * | 5/1993 | Birang et al. | 356/300 |
| 5,250,095 | A | * | 10/1993 | Segel, Jr. et al. | 65/378 |
| 5,268,737 | A | * | 12/1993 | Fukuma et al. | 356/328 |
| 5,410,413 | A | * | 4/1995 | Sela | 356/446 |
| 5,445,964 | A | * | 8/1995 | Lee et al. | 436/60 |
| 5,521,703 | A | * | 5/1996 | Mitchell | 356/301 |
| 5,656,974 | A | * | 8/1997 | Thomann et al. | 331/3 |
| 6,039,697 | A | * | 3/2000 | Wilke et al. | 600/532 |
| 6,249,343 | B1 | * | 6/2001 | Wang et al. | 356/243.1 |

* cited by examiner

Primary Examiner—Robert H. Kim
Assistant Examiner—Allen C Ho
(74) Attorney, Agent, or Firm—Reed Smith LLP

(57) ABSTRACT

An optical reference signal with a gas sealed in a space, an optical fiber and a lens collecting the light beam exiting the optical fiber before the front end of the space and a photodetector at the back end of the space, which can be connected with an evaluation device. Such an optical reference element makes it possible to use cost-effective and readily available components to provide a reference signal for calibrating an optical spectrum analyzer, for example. The optical reference element is connected to the output of the optical device.

10 Claims, 1 Drawing Sheet

OPTICAL REFERENCE ELEMENT AND PROCEDURE FOR THE SPECTRAL CALIBRATION OF AN OPTICAL SPECTRUM ANALYZER

BACKGROUND OF THE INVENTION

1. Field of the Invention

The present invention relates to an optical reference element and a procedure for the spectral calibration of an optical spectrum analyzer with fiber input in which the optical spectrum analyzer is calibrated by passing a reference signal through it.

2. Description of the Background

Referring to EP 0 758 075 A1, for example, it is known to calibrate optical spectrum analyzers by exposing the optical spectrum analyzer to a reference signal having a precisely known wavelength. The optical spectrum analyzer is calibrated with the reference signal arriving at the output of the optical spectrum analyzer, taking into account the rotation angle, e.g., of the diffraction grating. To this end, a gas absorption cell with a specific gas having a precisely known wavelength or wavelength spectrum is used to generate a distinct reference wavelength.

In a spectral analyzer with fiber input, it is necessary to couple the reference light in an optical fiber. When using a gas absorption cell, the gas is generally sealed in a sealed glass tube whose end surfaces have poor optical properties. Due to this poor surface quality, imaging in a single-mode fiber through this tube is associated with very high losses of light, since the power focused on an approx. 10 $\mu$m spot is then transported to the calibrated optical device. To prevent this, it is necessary to use a very powerful, and hence expensive, reference light source or a gas vessel with ground, expensive surfaces.

Therefore, in view of this problem with conventional devices, the object of this invention is to propose a way to realize a reference signal for calibrating optical devices as easily as possible and using conventional, commercially available components, in particular in optical spectrum analyzers.

BRIEF SUMMARY OF THE INVENTION

According to the present invention, an optical reference element is proposed that exhibits a space, preferably glass tubes, with an enclosed gas. The beam exiting the optical fiber is collected by a lens in front end of the space. Such a lens reduces the size, wherein a lens with continuously changing refractive index (graded index lens) is particularly advantageous. The optical reference element also exhibits a photodetector in front of the back end of the space filled with gas, which can be connected with an evaluation device. In this case, the photodetector can be situated directly against or at a slight distance from the space.

This configuration gives rise to an optical reference element that can be manufactured as a component and hooked up to the output of an optical device with fiber output, e.g., an optical spectrum analyzer. Therefore, the reference wavelength is imaged by the optical reference element after the optical device. As a result, the special imaging quality mentioned at the outset is no longer necessary, since the optical signal is converted into an electrical signal right after exiting the space filled with gas. To this end, it is sufficient that the beam of light hit a sufficiently large photodiode after the space.

To achieve as compact a construction as possible, the photodetector is directly connected with the space, preferably the glass tube, in another advantageous configuration. In addition, the lens is designed as a graded index lens, and also connected directly with the glass tube.

The lens space filled with gas and photodetector are integrated into one casing, e.g., in a cylindrical sleeve with or without frontal seals, from which only the optical fiber line and photodetector connections project.

In accordance with one embodiment of the invention, an optical reference element is disclosed which comprises: a space filled with gas, an optical fiber, a lens, where said lens is positioned between the space and optical fiber and collects the beam of light exiting the optical fiber, an evaluation device, and a photodetector which is positioned at the back end of the space and is connected with the evaluation device.

In accordance with another embodiment of the invention, a method for the spectral calibration of an optical spectrum analyzer with fiber input is disclosed, where the method comprises the steps of: (1) calibrating the optical spectrum analyzer by passing a reference signal through it, (2) routing the light of a broadband light source directly to the input of the optical spectrum analyzer via a single-mode fiber to generate the reference signal, and, (3) routing the light at output, after it passes through the optical spectrum analyzer, to a space filled with gas with a photodetector connected thereto.

In accordance with yet another embodiment of the invention, a method for performing the spectral calibration of an optical spectrum analyzer is disclosed, where the method comprises the steps of: (1) defining a space filled with gas; and (2) arranging a photodetector at one end of the space at the output of an optical spectrum analyzer as the reference cell.

BRIEF DESCRIPTION OF THE DRAWINGS

For the present invention to be clearly understood and readily practiced, the present invention will be described in conjunction with the following Figures, wherein.

DETAILED DESCRIPTION OF THE INVENTION

Figure 1:
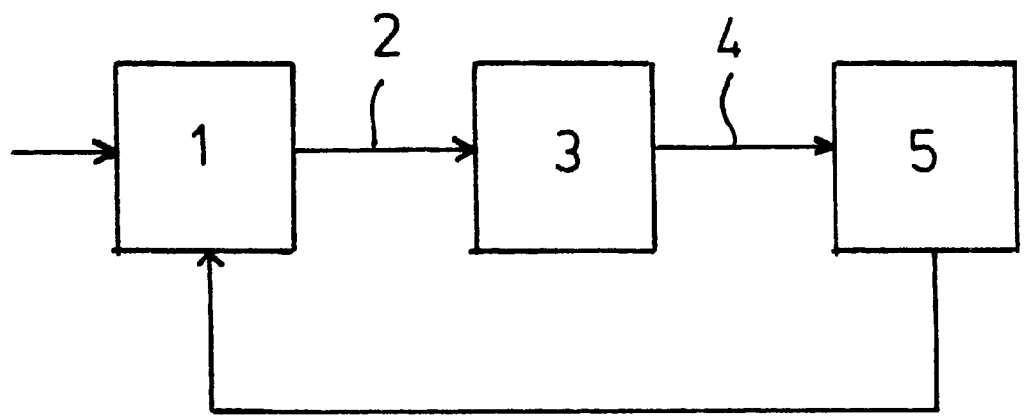
FIG. 1 is a block diagram with the basic layout of the optical reference element.

According to the basic block diagram in FIG. 1, the light to be analyzed, the reference light in this case, hits the input gap of an optical spectrum analyzer 1. The light source for the reference signal is a broadband light source (LED) connected with the optical spectrum analyzer 1 by a single-mode fiber. The optical structure of an optical spectrum analyzer 1 is generally known, and described, for example, in the book entitled Fiber Optic Test and Measurement, by Dennis Derickson, 1998, ISBN 0-13-534330-5. The light is routed from the output of the optical spectrum analyzer 1 via an optical fiber 2 to the optical reference element 3. The optical reference element 3 delivers electrical signals via the line 4 to the computer 5, which evaluates them in a known manner, and calibrates the optical spectrum analyzer 1 as a function of the rotation angle of the diffraction grating in the optical spectrum analyzer 1.

Figure 2:
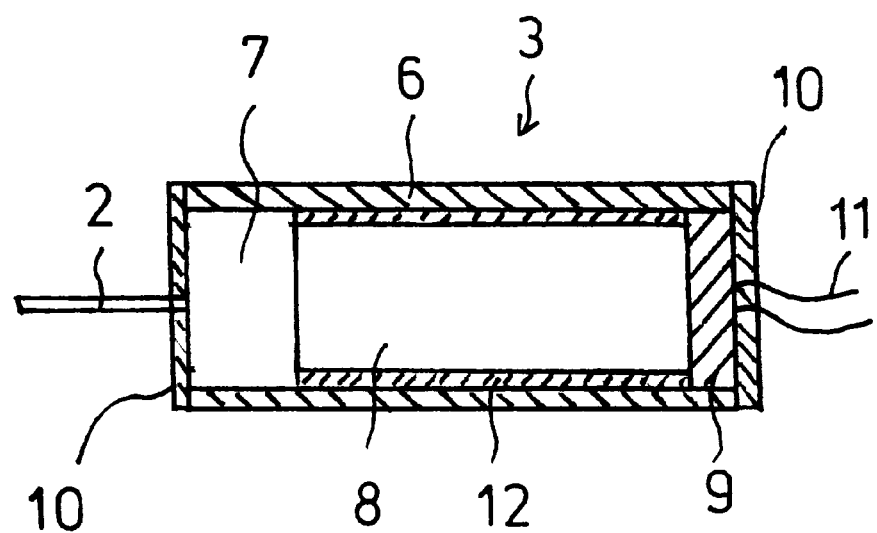
FIG. 2 is a longitudinal section through the optical reference element.

FIG. 2 shows a cross section of the optical reference element 3 with a sleeve-like casing 6, which houses a graded index lens 7, an absorption cell 8 and a photodetector 9. In the embodiment, the front of the casing 6 is sealed with two covers 10, through which are routed the optical fibers 2 or connecting lines 11. The optical fiber is directly connected with the graded index lens 7. In turn, the latter is directly situated at the front end of the absorption cell 8, which is also cylindrical in shape. The [glass tube 12 inside]the absorption cell 8 inside the glass tube 12 contains the gas necessary for reference purposes. The photodetector 9 is directly secured to the other end of the glass tube 12. The graded index lens 7 and photodetector 9 can be bonded to the glass tube 12 with a suitable adhesive.

An optical reference element equipped in such a way can be assembled out of conventional, readily available components, and is ideally suited for providing a desired reference signal for calibrating an optical device, in particular an optical spectrum analyzer.

The present invention is not to be considered limited in scope by the preferred embodiments described in the specification. Additional advantages and modifications, which will readily occur to those skilled in the art from consideration of the specification and practice of the invention, are intended to be within the scope and spirit of following claims.

I claim:

1. An optical reference element, comprising:
   a casing with a space filled with gas,
   an optical fiber entering at one end into said casing,
   a lens, where said lens is positioned between the space and optical fiber and collects the beam of light exiting the optical fiber with said casing, and
   a photodetector which is positioned at the back end of the space and is connectable to an evaluation device.

2. An optical reference element according to claim 1 wherein the gas is sealed in a glass tube.

3. An optical reference element according to claim 1 wherein the photodetector is directly connected with the gas-filled space.

4. An optical reference element according to claim 1 wherein the lens is designed as a graded index lens, and directly connected with the gas-filled space.

5. An optical reference element according to claim 1 wherein the lens, space, and photodetector are integrated into a sleeve-like casing.

6. An optical reference element according claim 1 wherein the reference element is arranged at the output of an optical spectrum analyzer.

7. A method for the spectral calibration of an optical spectrum analyzer with fiber input, said method comprising the steps of:
   (1) routing the light of a broadband light source directly to the input of the optical spectrum analyzer via a single-mode fiber to generate a reference signal,
   (2) routing the light at output, after it passes through the optical spectrum analyzer, to a space filled with gas with a photodetector connected thereto the gas filled space and the photodetector being integrated in a common casing, and
   (3) calibrating the optical spectrum analyzer with the output of the photodetector.

8. The method according to claim 7 wherein the light is routed to the space via a fiber connected to said casing and graded index lens arranged in said casing.

9. A method for performing the spectral calibration of an optical spectrum analyzer, said method comprising the steps of:
   (1) defining a space filled with gas in a casing; and
   (2) arranging in said casing a photodetector at one end of the space at the output of an optical spectrum analyzer as the reference cell.

10. An optical reference element, comprising:
    a space filled with gas;
    an optical fiber;
    a lens, where said lens is positioned between the space and optical fiber and collects the beam of light exiting the optical fiber;
    an evaluation device; and
    a photodetector which is positioned at the back end of the space and is connected with the evaluation device, wherein the lens, space, and photodetector are integrated into a sleeve-like casing.

* * * * *